(12) United States Patent
Yamazaki et al.

(10) Patent No.: US 8,994,872 B2
(45) Date of Patent: Mar. 31, 2015

(54) IMAGE PICKUP APPARATUS AND METHOD FOR CONTROLLING THE SAME

(71) Applicant: Canon Kabushiki Kaisha, Tokyo (JP)

(72) Inventors: Hiroshi Yamazaki, Machida (JP); Takeshi Ogawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 68 days.

(21) Appl. No.: 13/957,770

(22) Filed: Aug. 2, 2013

(65) Prior Publication Data

US 2014/0043523 A1 Feb. 13, 2014

(30) Foreign Application Priority Data

Aug. 10, 2012 (JP) ................................ 2012-178921

(51) Int. Cl.
  *H04N 5/232* (2006.01)
  *G03B 13/00* (2006.01)
  *H04N 5/369* (2011.01)

(52) U.S. Cl.
  CPC ......... *H04N 5/23212* (2013.01); *H04N 5/3696* (2013.01)
  USPC ............ 348/345; 348/349; 348/350; 348/356

(58) Field of Classification Search
  CPC . H04N 5/23212; H04N 5/3696; H04N 9/045; H04N 13/0225; H04N 1/02409; H04N 1/3876; H04N 5/359; H04N 5/378
  USPC ....................... 348/345, 349, 302, 222.1, 294
  See application file for complete search history.

(56) References Cited

U.S. PATENT DOCUMENTS

| | | | |
|---|---|---|---|
| 2002/0044607 A1* | 4/2002 | Koga et al. | 375/240.16 |
| 2010/0188522 A1* | 7/2010 | Ohnishi et al. | 348/222.1 |
| 2010/0309329 A1* | 12/2010 | Hiramoto | 348/222.1 |
| 2011/0025904 A1* | 2/2011 | Onuki et al. | 348/360 |
| 2012/0328208 A1* | 12/2012 | Luo et al. | 382/238 |

FOREIGN PATENT DOCUMENTS

JP 2001-250931 A 9/2001

* cited by examiner

*Primary Examiner* — Twyler Haskins
*Assistant Examiner* — Padma Haliyur
(74) *Attorney, Agent, or Firm* — Cowan, Liebowitz & Latman, P.C.

(57) ABSTRACT

A shift amount between a plurality of image signals that is obtained from pixels in each of which a plurality of photoelectric conversion units are provided is computed from an amount of correlation based on a difference value between the plurality of image signals. Also, if the difference value that is used for computing the amount of correlation is not less than a predetermined upper limit, a predetermined value that is not more than the upper limit is used as the difference value.

5 Claims, 9 Drawing Sheets

IMAGE PICKUP APPARATUS AND METHOD FOR CONTROLLING THE SAME

BACKGROUND OF THE INVENTION

1. Field of the Invention

The present invention relates to an image pickup apparatus and a method for controlling the same.

2. Description of the Related Art

Conventionally, a technology has been considered in which an image sensor including a plurality of photoelectric conversion units for a single microlens is used to obtain pupil-divided images, and a phase difference between the two obtained pupil-divided images is obtained, thereby performing focus detection (Japanese Patent Laid-Open No. 2001-250931).

In the technology of Japanese Patent Laid-Open No. 2001-250931, each photoelectric conversion unit has a reduced area relative to that of the conventional photoelectric conversion unit, conceivably causing a problem in that each photoelectric conversion unit has a reduced capacity to accumulate an electric charge and easily becomes saturated. If even one of the divided photoelectric conversion units becomes saturated, the relationship between amounts of incident light and output voltages will be nonlinear, even if the outputs of the plurality of photoelectric conversion units corresponding to the same microlens are added, resulting in a deterioration in image quality.

In order to address this problem, it is conceivable to adopt a pixel structure in which an electric charge leaks from the saturated photoelectric conversion unit into another photoelectric conversion unit that corresponds to the same microlens. With this, the electric charge that is output by the saturated photoelectric conversion unit is accumulated in the other unsaturated photoelectric conversion unit, enabling an increase in linearity between amounts of input light and output voltages obtained by adding the outputs of the plurality of photoelectric conversion units corresponding to the same microlens.

Although such a configuration makes it possible to suppress the deterioration in image quality caused due to loss of the electric charge, the saturation level of the individual photoelectric conversion units is not improved. Also, since the photoelectric conversion unit that accumulates the electric charge leaked from the saturated photoelectric conversion unit presents a higher output than the original output of the photoelectric conversion unit, the pupil-divided images used for obtaining the phase difference are deformed (image distortion occurs) and the accuracy of the phase difference (shift amount) detection is deteriorated. Specifically, the difference in outputs between the photoelectric conversion units may be reduced due to the leaked electric charge, and thus the difference between the pupil-divided images is also reduced, possibly causing pseudo in-focus in which shift is superficially reduced.

That is, the focus detection accuracy deteriorates and focus detection may not be possible. Since the focus detection accuracy deteriorates despite favorable images being obtained, no distinction is made between when focus detection is possible and when focus detection is not possible, which also causes the user confusion.

For example, by not using the output of pixels having a saturated photoelectric conversion unit for the phase-difference detection, the accuracy in phase-difference detection may be improved. However, in the case where the proportion of saturated photoelectric conversion units is high, normalization of a correlation image is necessary in order to compute an accurate shift amount, and because the calculation amount of normalization is proportional to the number of pixels included in the field of vision, the circuit size may increase following an increase in the number of pixels.

SUMMARY OF THE INVENTION

Some embodiments of the present invention provides an image pickup apparatus that is capable of preventing an occurrence of pseudo in-focus even if a pupil-divided image is distorted due to saturation, while suppressing an enlargement in circuit size, and a method for controlling the same.

According to an aspect of the present invention, there is provided an image pickup apparatus for processing signals obtained from an image sensor that includes a plurality of pixels in each of which a first photoelectric conversion unit and a second photoelectric conversion unit are provided, the image pickup apparatus comprising: a computing unit which computes a shift amount, which is used for focus detection based on the phase-difference detection method, between a first image signal that is obtained from outputs of the first photoelectric conversion units and a second image signal that is obtained from outputs of the second photoelectric conversion units; and a unit which performs focus control of an imaging lens on the basis of the shift amount, wherein the computing unit computes the shift amount from an amount of correlation based on a difference value between the first image signal and the second image signal, the difference value being computed by shifting relative positions between the first image signal and the second image signal, and computes the amount of correlation, if the difference value is not less than a predetermined upper limit, using a predetermined value that is not more than the upper limit as the difference value.

Further features of the present invention will become apparent from the following description of exemplary embodiments with reference to the attached drawings.

DESCRIPTION OF THE EMBODIMENTS

Exemplary embodiments of the present invention will now be described in detail in accordance with the accompanying drawings.

Figure 2:
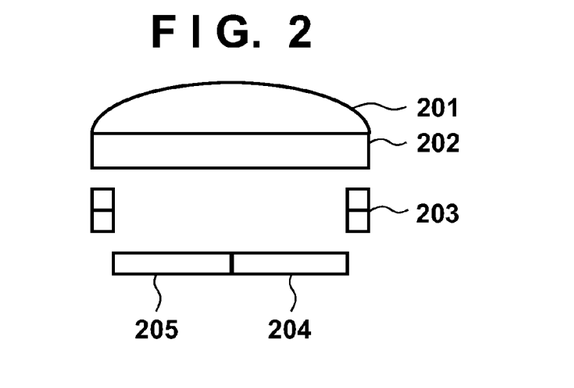
FIG. 2 is a vertical cross-sectional view illustrating an example of a pixel structure of an image sensor that generates image signals to which the present invention is applicable.

FIG. 2 is a vertical cross-sectional view illustrating an example of a pixel structure of an image sensor that generates image signals to which the present invention is applicable. Here, the image sensor is assumed to include a plurality of pixels each of which includes a microlens and a plurality of photoelectric conversion units, and can output a plurality of image signals available for focus detection based on the phase-difference detection method. However, not all the pixels necessarily have such a configuration, and the image sensor may include, in addition to the pixels each having such a configuration, pixels each having a general configuration in which a photoelectric conversion unit is not divided and only one image signal is output. Hereinafter, for convenience, pixels having a configuration in which a photoelectric conversion unit is divided into a plurality of photoelectric conversion units are referred to as focus detection pixels and pixels having a general configuration in which a photoelectric conversion unit is not divided are referred to as general pixels.

A microlens 201 is provided for efficiently irradiating the photoelectric conversion units with light. A color filter 202 has a specific color for each pixel, and in general the colors of the color filters of the pixels are defined such that red (R), green (G), and blue (B) are regularly arranged. Pixels having a red color filter are referred to as red pixels. The same applies to the other colors.

Reference numeral 203 denotes a semiconductor wiring layer, and a photoelectric conversion unit 204 (first photoelectric conversion unit) and a photoelectric conversion unit 205 (second photoelectric conversion unit) are photodiodes.

In the general pixels, the photoelectric conversion units 204 and 205 constitute one photodiode, but the focus detection pixels that generate image signals according to the present embodiment are configured to include a plurality of divided photoelectric conversion units. In the following description, each of the plurality of photoelectric conversion units included in a focus detection pixel may be referred to as a divided pixel.

Signals constituted by signals obtained by divided pixels at the same position, of a plurality of focus detection pixels, such as a signal (first image signal) obtained from outputs of the photoelectric conversion units 204, and a signal (second image signal) obtained from outputs of the photoelectric conversion units 205, are pupil-divided images and have a parallax. Therefore, by detecting the parallax (phase difference or shift) of the pupil-divided images, it is possible to realize focus detection based on the phase-difference detection method, generation of a stereo image, and the like.

Also, since if outputs of the photoelectric conversion units 204 and 205 are added, substantially the same output can be obtained as that of the general pixels in which the photoelectric conversion unit is not divided, the added output, if subjected to general signal processing, can be used in the similar manner to an output of the general pixels.

Hereinafter, the problem of saturation of a divided pixel will be described with reference to FIG. 3.

Figure 3A:
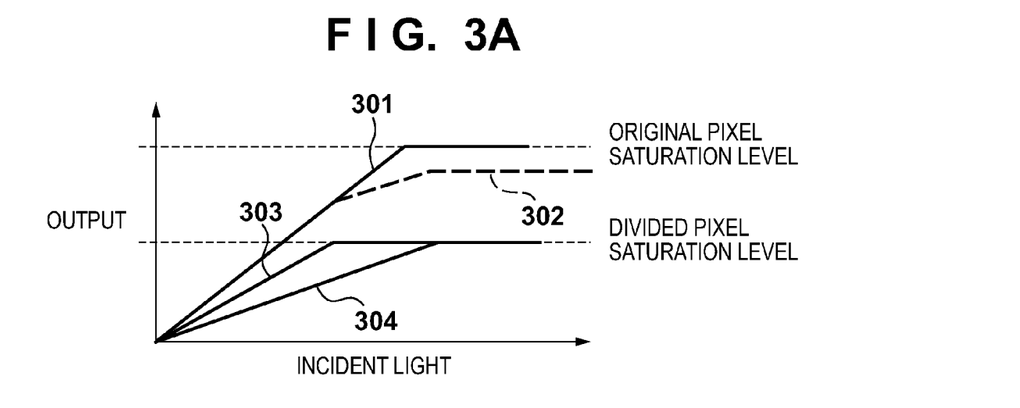
FIGS. 3A and 3B are graphs each illustrating an example of a relationship between amounts of light incident on a pixel and output levels of divided pixels.
Figure 3B:
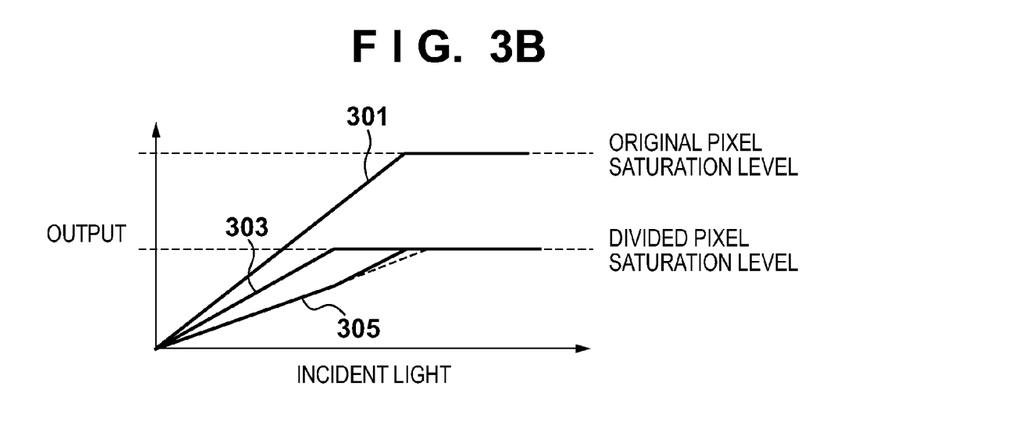

In FIG. 3, the horizontal axis indicates amounts of light incident on a pixel (microlens), and the vertical axis indicates output levels (pixel values) of the pixel. Reference numeral 301 denotes input-output characteristics in the case (of a general pixel) in which the photoelectric conversion unit is not divided, and has linearity that is kept until the output level reaches the saturation level.

Even if a photoelectric conversion unit is divided and rays of light having been incident on the microlens are evenly incident on the divided pixels, the added output obtained by adding outputs of the divided pixels would be expected to have the same characteristics as that of reference numeral 301. In fact, however, the amounts of light incident on the divided pixels are not even unless the focus detection pixel is located in the center of the image height (generally in the center of the screen) and is in the state of being focused.

Figure 9:
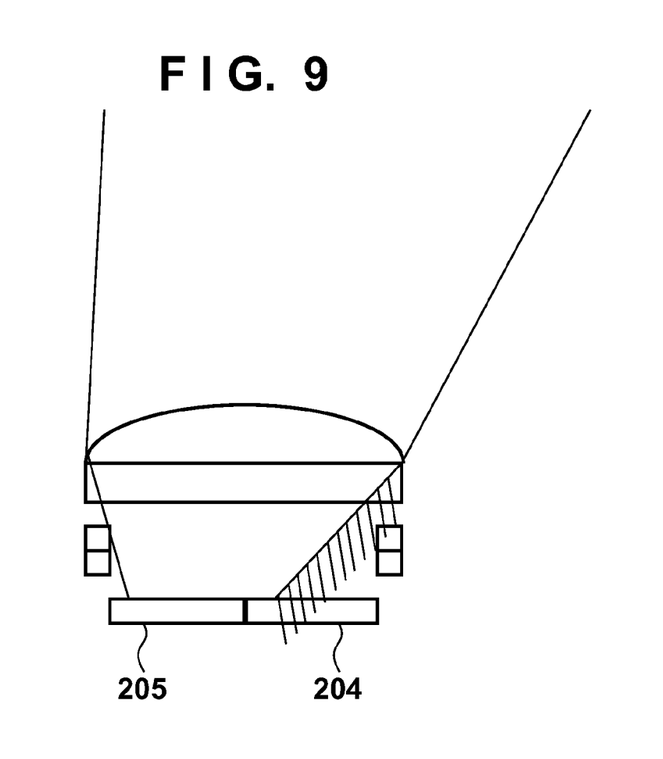
FIG. 9 is a cross-sectional view schematically illustrating light that is incident on a pixel at a position of high image height.

FIG. 9 illustrates a state in which a pixel at a position of high image height, that is, a pixel at the periphery of the screen is irradiated with light.

An image height is a distance from a light axis, and thus light is incident at an angle on a pixel at the periphery of the screen that is apart from the light axis. Therefore, a large difference arises between amounts of light incident on the photoelectric conversion units 204 and 205. In FIG. 9, most light is incident on the photoelectric conversion unit 205, and very little light is incident on the photoelectric conversion unit 204.

In this case, it is clear that the photoelectric conversion unit 205 will be saturated prior to the photoelectric conversion unit 204. In FIG. 3A, reference numeral 303 denotes input-output characteristics of the photoelectric conversion unit 205, and reference numeral 304 denotes input-output characteristics of the photoelectric conversion unit 204. Also, an added output level obtained by adding outputs of the photoelectric conversion units 204 and 205, as denoted by reference numeral 302, is such that the maximum value is lower under the influence of the saturation of the photoelectric conversion unit 205.

If, in order to prevent this problem, a configuration is adopted in which an electric charge generated after the photoelectric conversion unit 205 becomes saturated is leaked into the photoelectric conversion unit 204, the added output level obtained by adding the outputs of the photoelectric conversion units 204 and 205 will have the characteristics indicated by reference numeral 301, similarly to the general pixels. In this case, the input-output characteristics of the photoelectric conversion unit 204, as denoted by reference numeral 305 in FIG. 3B, is such that an increasing rate (a slope of the input-output characteristics) of the output level to the incident light becomes greater from the point at which the photoelectric conversion unit 205 becomes saturated.

Further, an image signal (an A image signal) that is obtained from the outputs of the plurality of photoelectric conversion units 204, and an image signal (a B image signal) that is obtained from the outputs of the corresponding plurality of photoelectric conversion unit 205 have a parallax that corresponds to a defocus amount of an imaging optical system, and have significantly different levels in an out-of-focus image. In this case, however, a saturated electric charge in one divided pixel is leaked into the other divided pixel, causing a phenomenon in which both the A image signal and the B image signal are saturated in a highlighted portion.

Figure 5A:
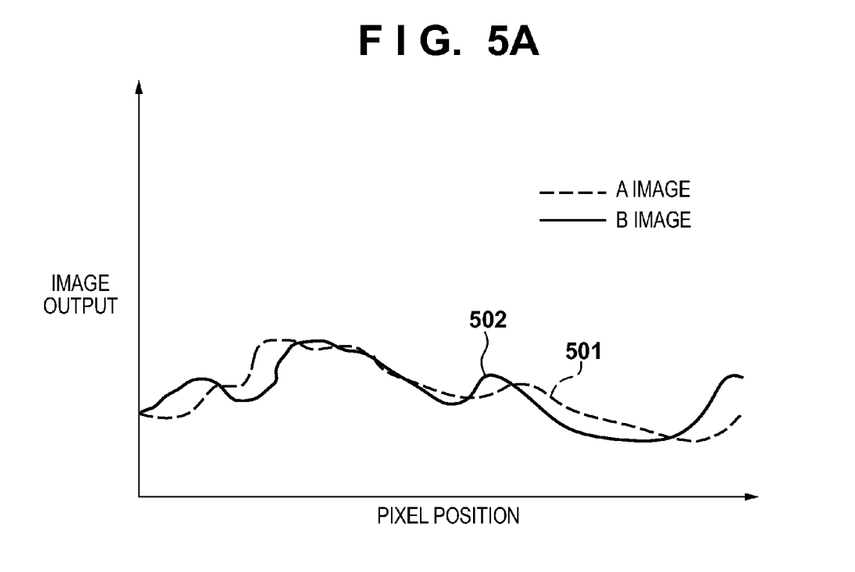
FIG. 5A is a graph illustrating an example of image signals that have no saturated parts.

FIG. 5A is a graph illustrating an example of the state in which the defocused A image signal and B image signal are not saturated over the entire region and a shift occurs. Reference numeral 501 denotes a wave pattern of the A image signal and reference numeral 502 denotes a wave pattern of the B image signal, and by multiplying an amount of shift (phase difference) between the A image signal and the B image signal by a constant that is defined depending on a base length, it is possible to compute the defocus amount.

Figure 5B:
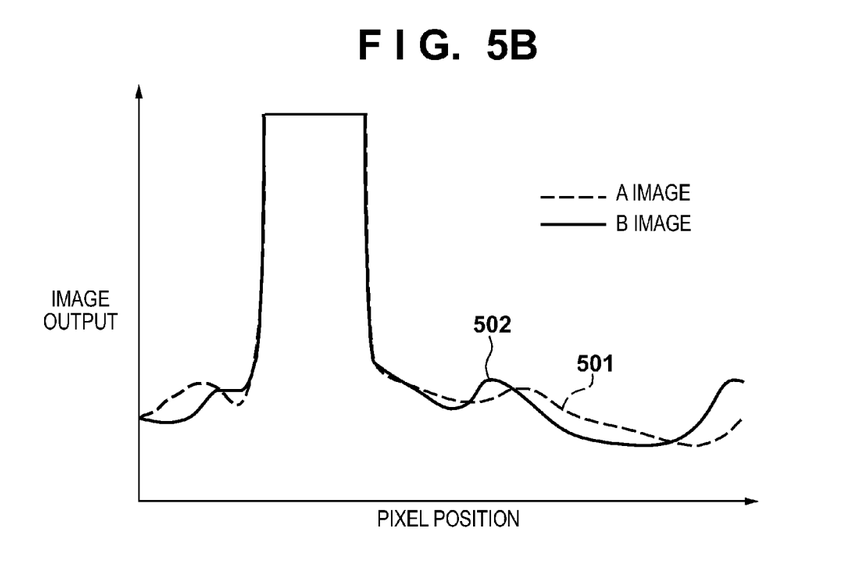
FIG. 5B is a graph illustrating an example of image signals that include saturated parts.

On the other hand, FIG. 5B is a graph illustrating an example in which parts of the defocused A image signal and B image signal are saturated. Since the A image signal and the B image signal are shifted, it should be possible to obtain a defocus amount, but no shift occurs in the saturated parts.

In such a case, if in the correlation calculation of the A image signal and the B image signal, an SAD, which is a sum of absolute difference values or an SSD, which is a sum of squares of absolute difference values, is obtained as an amount of correlation, the amount of correlation will be a value in which difference values of the saturated parts that have high outputs are dominant.

Figure 6A:
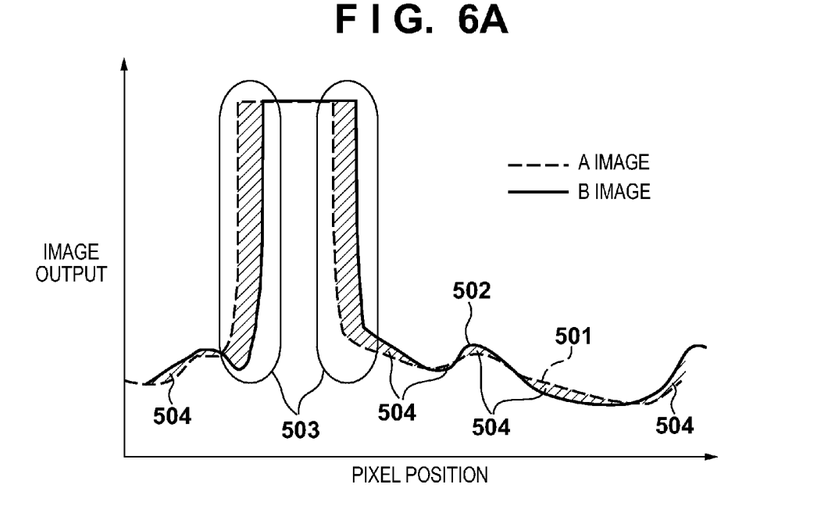
FIG. 6A is a graph illustrating an example of amounts of correlation computed for the image signals in FIG. 5B by a conventional method.

FIG. 6A illustrates a process for computing amounts of correlation while shifting relative positions of the A image signal and the B image signal shown in FIG. 5B. While slowly shifting the B image signal rightward with respect to the A image signal, the amounts of correlation are computed sequentially and a relationship between the shift amounts and the amounts of correlation is obtained.

As illustrated in FIG. 6A, if the image signal B is shifted from the state in FIG. 5B, output difference values 503 in the saturated parts are significantly larger than output difference values 504 in the unsaturated parts. Accordingly, the value of the SAD or the SSD, which is an accumulation of the output difference values, is a value in which the output difference values 503 in the saturated parts is dominant, instead of the output difference values 504 in the unsaturated parts, which originally should be obtained as the amounts of correlation.

Figure 7A:
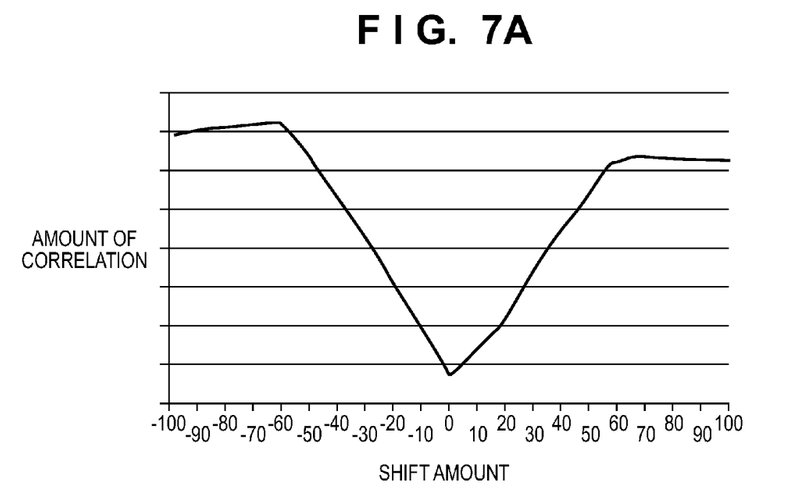
FIG. 7A is a graph illustrating a correlation image that corresponds to FIG. 6A.

FIG. 7A is a graph illustrating a correlation image that is obtained by calculating the correlation between the A image signal 501 and the B image signal 502 in FIG. 5B. A correlation image refers to an image showing a relationship between the amounts of correlation between the A image signal and the B image signal that are obtained while shifting relative positions of the A image signal and the B image signal, and the shift amounts. Note here that the lower the amount of correlation is, the higher the correlation between the A image signal and the B image signal is.

In FIG. 7A, the horizontal axis indicates shift amounts, and the amount of correlation is the smallest when the shift amount is 0, so it may be determined that the images are the most consistent in the state in which the A image signal and the B image signal are not shifted. This results from the fact that the amount of correlation is largely influenced by the absence of shift between the A image signal and the B image signal in the saturated parts in which the signals have the same level.

As described above, if an electric charge leakage occurs due to saturation and there is no shift in the saturated part, a defocus amount that is closer to 0 than the actual defocus amount will be computed.

Figure 4:
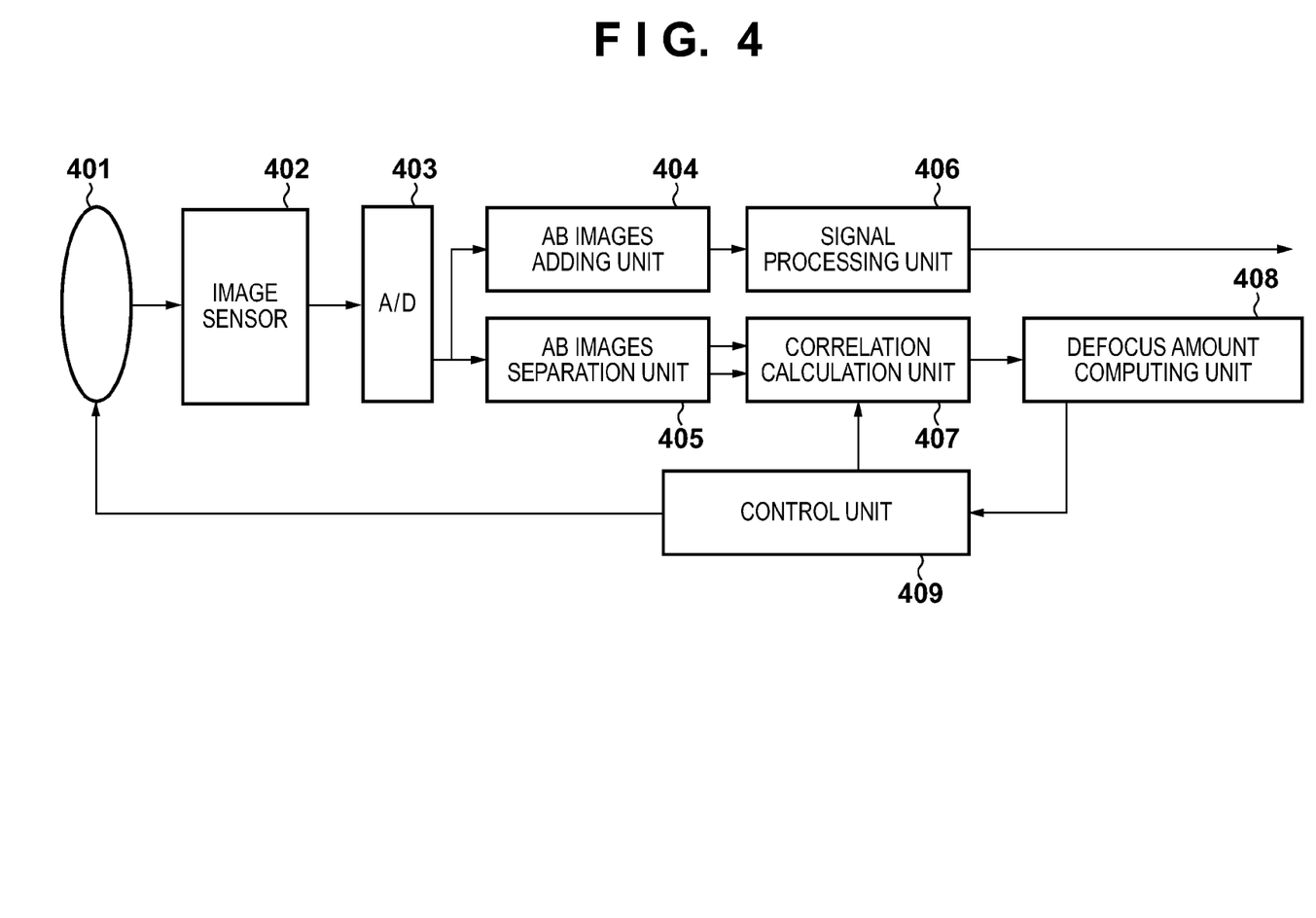
FIG. 4 is a block diagram illustrating an example of a functional configuration of an image pickup apparatus according to a first embodiment of the present invention.

FIG. 4 is a block diagram illustrating an example of a functional configuration of an image pickup apparatus according to the present embodiment. Note that FIG. 4 only shows elements that are needed for describing the present invention, among constituent elements included in the image pickup apparatus.

A lens 401 is an imaging lens that forms a subject optical image on an imaging surface. The lens 401 includes a focus lens that can be driven by a control unit 409. An image sensor 402 is a CMOS or CCD image sensor in which are arranged a plurality of pixels, each having the configuration illustrated in FIG. 2 in which two photoelectric conversion units are provided for one microlens. An AD converter 403 A/D converts a signal that is output by each pixel of the image sensor 402 and outputs the converted signal.

Hereinafter, operations of an AB images adding unit 404, an AB images separation unit 405, a signal processing unit 406, a correlation calculation unit 407, a defocus amount computing unit 408, and a control unit 409, which is a micro computer that controls an entire system, will be described in detail.

Figure 8:
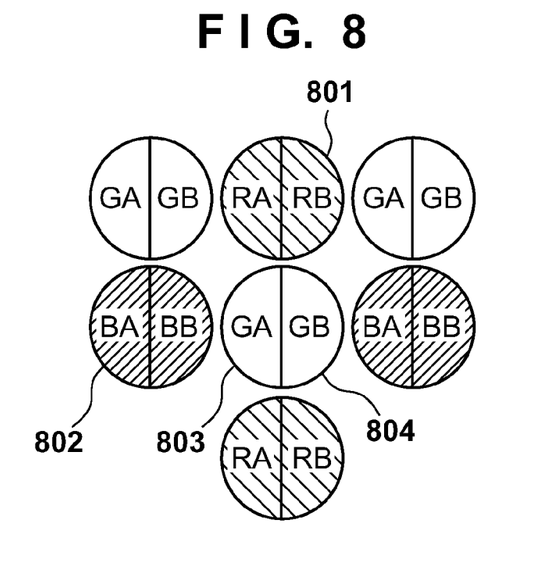
FIG. 8 is a diagram illustrating an example of a pixel arrangement of an image sensor that is applicable to the embodiment of the present invention.

FIG. 8 is a diagram illustrating an example of the pixel arrangement of an image sensor 402. The image sensor 402 includes color mosaic filters in a primary color Bayer arrangement, and each pixel indicated by one circle is provided with a color filter of any one of the colors red, green, and blue. The pixel provided with the red color filter is referred to as a red pixel, the pixel provided with the green color filter is referred to as a green pixel, and the pixel provided with the blue color filter is referred to as a blue pixel.

Reference numerals GA 803 and GB 804 respectively denote an A image pixel and a B image pixel of the green pixel. Similarly, reference numeral RB 801 denotes a B image pixel of the red pixel, and reference numeral BA 802 is an A image pixel of the blue pixel.

With respect to each of the red pixels, the green pixels, and the blue pixels, the AD converter 403 outputs an A image signal and a B image signal, sequentially. Accordingly, if the A image signal and the B image signal of the same pixel are added by the AB images adding unit 404, an output that is similar to that of a general pixel can be obtained.

From the signal output by the AB images adding unit 404, of each pixel in the Bayer arrangement, in which the pixel has only the one component of red, green, or blue, the signal processing unit 406 generates a color video signal having the three components of red, green, and blue for each pixel according to a well-known arbitrary method, and outputs the generated color video signal.

The AB images separation unit 405 supplies the A image signal and the B image signal of the same color pixel that are output by the AD converter 403, in parallel, to the correlation calculation unit 407.

The correlation calculation unit 407 computes amounts of correlation while shifting the relative position of one of the A image signal and the B image signal with respect to the other image signal that is defined as a reference, so as to obtain a correlation image as illustrated in FIG. 7A, and outputs the obtained correlation image to the defocus amount computing unit 408.

The defocus amount computing unit 408 analyzes the correlation image, and decides the shift amount in which the correlation between the A image signal and the B image signal is the highest. The defocus amount computing unit 408 also obtains a defocus amount by multiplying the decided shift amount by a constant that is determined depending on a base length of the divided pixels that have output the A image signal and the B image signal.

The control unit 409 drives the focus lens of the lens 401 according to the computed defocus amount so as to cause the lens 401 to focus on the subject.

Figure 1:
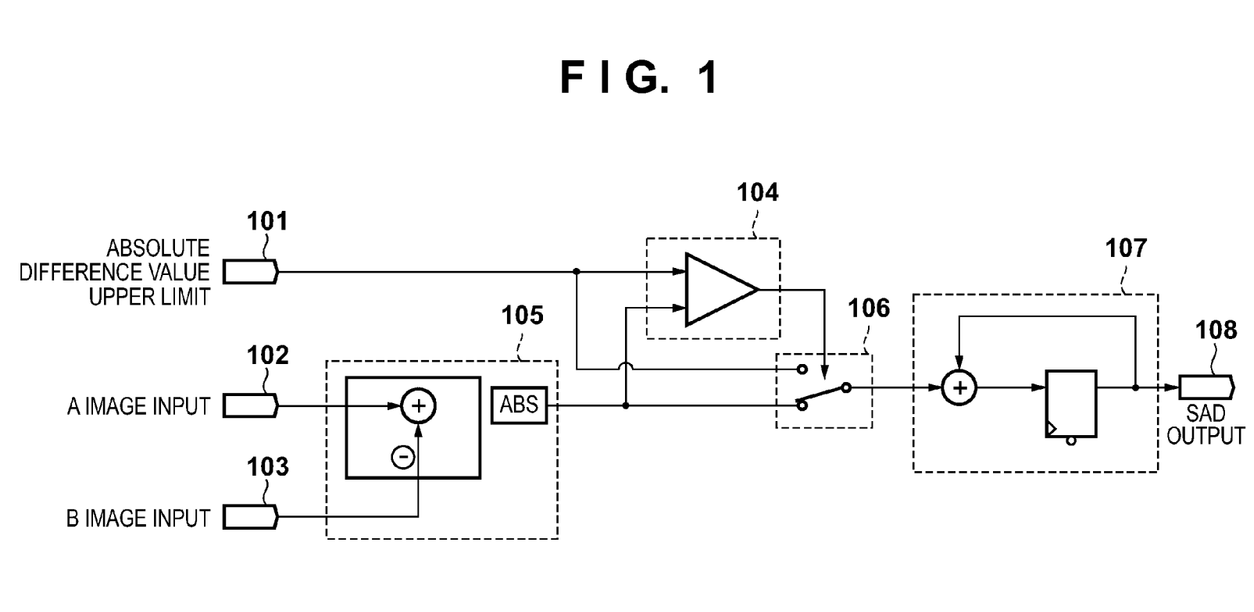
FIG. 1 is a diagram illustrating an example of a circuit configuration of a correlation calculation unit 407 in FIG. 4.

FIG. 1 is a diagram illustrating an example of a circuit configuration in the case where the correlation calculation unit 407 in FIG. 4 obtains a SAD as an amount of correlation.

An absolute difference value upper limit 101 is a setting value that is set by the control unit 409, and designates an upper limit of absolute difference values in order to lower the influence of the saturated part on the SAD. The absolute difference value upper limit 101 can be set to, for example, an upper limit within the range of absolute difference values generally obtained in the case where there is no saturation, or to a value that is slightly larger than this upper limit.

The A image signal and the B image signal that have been accumulated in a buffer located upstream of the correlation calculation unit 407 are input as an A image input 102 and a B image input 103 one pixel at a time. The shift amount between the A image signal and the B image signal is changed each time an amount of correlation is obtained with respect to one shift amount. In an absolute difference value computing circuit 105, absolute difference values between the A image signal and the B image signal are computed, and the computed absolute difference values are supplied to an accumulation circuit 107 via a switch 106. The accumulation circuit 107 accumulates, every one shift amount, the input absolute difference values. When the computing and the integration of absolute difference values between the A image signal and the B image signal for one shift amount are completed, a value of an output (SAD output) 108 of the accumulation circuit 107 is stored in association with the shift amount, and the accumulation circuit 107 is reset. When amounts of correlation are computed until the shift amount is a predetermined maximum value, a correlation image is then output to the defocus amount computing unit 408.

During the computing of the amounts of correlation, a limiter circuit 104 compares the output value of the absolute difference value computing circuit 105 with the absolute difference value upper limit 101. If the absolute difference value is the upper limit or more, the input of the switch 106 is switched to the absolute difference value upper limit. It is thereby possible to reduce the influence of the absolute difference value in the saturated part on the amount of correlation.

Figure 6B:
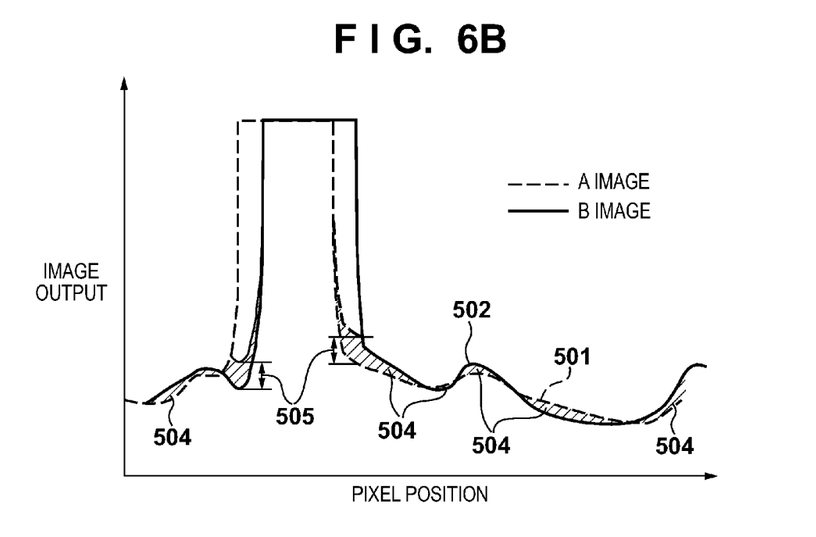
FIG. 6B is a graph illustrating an example of amounts of correlation computed for the image signals in FIG. 5B by a method according to the embodiment of the present invention.

FIG. 6B illustrates distribution of absolute difference values computed in the case where the limiter circuit 104 is applied under the same situation as that in FIG. 6A. As is clear from the comparison with FIG. 6A, the output difference values associated with the saturated part are limited to upper limits 505, and thus a difference between the output difference value in the saturated part and the output difference value 504 in the unsaturated port is small. Accordingly, the influence of the output difference value in the saturated part on the accumulated amount of the output difference values that is obtained as an amount of correlation is suppressed, and the situation of the output difference values 504 in the unsaturated parts is likely to be reflected on the amount of correlation. Therefore, it is possible to improve the accuracy of the defocus amount that is decided based on the amount of correlation.

Note that since the above-described upper limit is defined as "unlimited" if there is no saturated part, the upper limit can be changed, for example, such that the settable maximum value is set as the upper limit.

Also, a saturation detection threshold for detecting a saturation state of a pupil divided pixel is set, and the saturation state is detected by comparing the A image signal or the B image signal with the saturation detection threshold. If it is detected that the A image signal or the B image signal exceeds the saturation detection threshold, the upper limit is changed to a value that is low enough to not exclude the absolute difference value between the signal components that is originally used for calculating the correlation between the A image signal and the B image signal. Examples of a specific method for changing the upper limit include the following methods:

Scanning a memory in which the A image signal and the B image signal are stored so as to decide an upper limit, and performing correlation calculation.

Figure 11A:
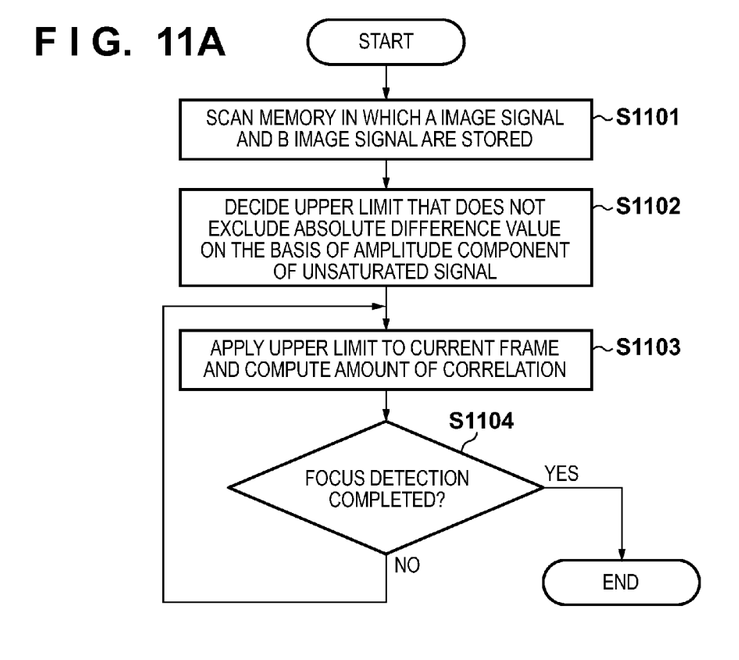
FIGS. 11A and 11B are diagrams illustrating an example of a method for changing an upper limit of absolute difference values that is used for the correlation calculation processing in the first embodiment of the present invention.

Using an upper limit decided in the first frame in subsequent frames, and performing correlation calculation (FIG. 11A).

Figure 11B:
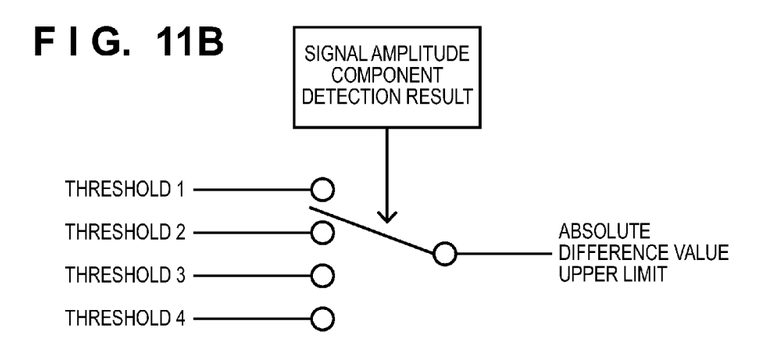

Preparing a plurality of upper limits in advance, and deciding an upper limit by detecting an amplitude component (maximum value−minimum value) other than a saturated part of a signal. Also thereafter, while checking the saturation state, selecting, as an upper limit, a value that is low enough to not exclude the absolute difference value between signal components of the A image signal and the B image signal (FIG. 11B).

Preparing a plurality of upper limits in advance, checking the saturation state while performing correlation calculation with the use of the plurality of upper limits in parallel, and selectively employing the result of the correlation calculation using the upper limit with which the influence of the saturation can be reduced most significantly.

Hereinafter, the processing in the case where correlation calculation is performed using an upper limit decided in the first frame in subsequent frames will be described with reference to the flowchart illustrated in FIG. 11A. The following processing steps are performed by the correlation calculation unit 407.

Step S1101: Scanning a memory in which the A image signal and the B image signal are stored.

Step S1102: Deciding, from an amplitude component of an unsaturated signal among the A image signal and the B image signal, a value that is low enough to not exclude an absolute difference value between the A image signal and the B image signal, as an upper limit.

Step S1103: Applying the upper limit obtained in step S1102 to a current frame, so as to compute an amount of correlation.

Step S1104: Determining whether or not completion of the focus detection is instructed by switching of a camera mode, or the like. If it is determined that the completion is instructed, the processing ends. If it is determined that the completion is not instructed, the processing advances to step S1103, where the upper limit obtained in step S1102 is applied to the current frame and an amount of correlation is computed.

Figure 7B:
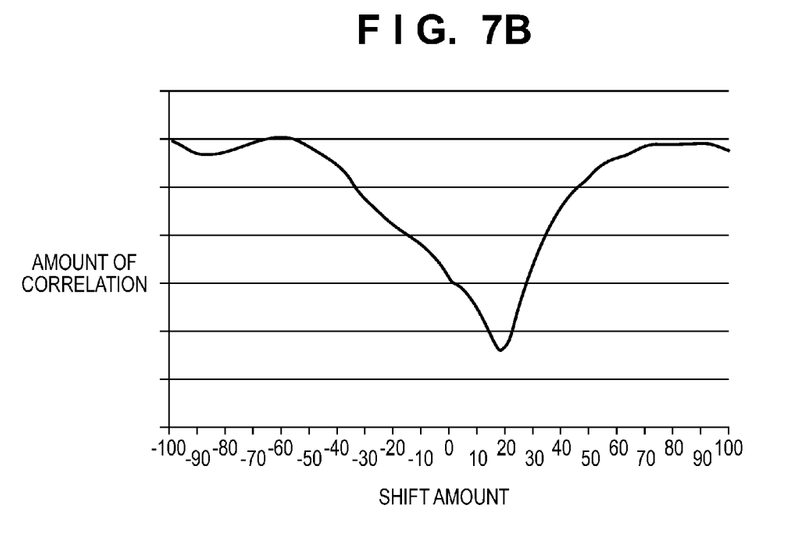
FIG. 7B is a graph illustrating a correlation image that corresponds to FIG. 6B.

FIG. 7B illustrates a correlation image that corresponds to FIG. 6B. In contrast to the correlation image in FIG. 7A that corresponds to FIG. 6A, a minimal value of the amounts of correlation is obtained with the shift amount that corresponds to the actual defocus amount.

As described above, according to the present embodiment, in a signal processing for calculating an amount of correlation based on a difference value between two image signals that is used for computing a defocus amount, an upper limit of the absolute difference value is restricted. Therefore, even in the case where two image signals cause image distortion due to saturation, it is possible to suppress the influence of the difference value in the saturated part on the amount of correlation and to calculate a more accurate amount of correlation, making it possible to prevent occurrence of pseudo in-focus. Also, the size of the circuit that is necessary for restricting an upper limit of the difference value does not depend on the number of pixels, and thus a small circuit is sufficient, preventing an enlargement of the circuit size due to an increased number of pixels of the image sensor.

Second Embodiment

Next, an image pickup apparatus according to a second embodiment of the present invention will be described with reference to FIG. 10.

In the first embodiment, the correlation calculation unit 407 is configured by the circuit as illustrated in FIG. 1, but in the present embodiment, the correlation calculation unit 407 is configured by a microcomputer, and operations similar to those in the circuit in FIG. 1 are realized by software.

Figure 10:
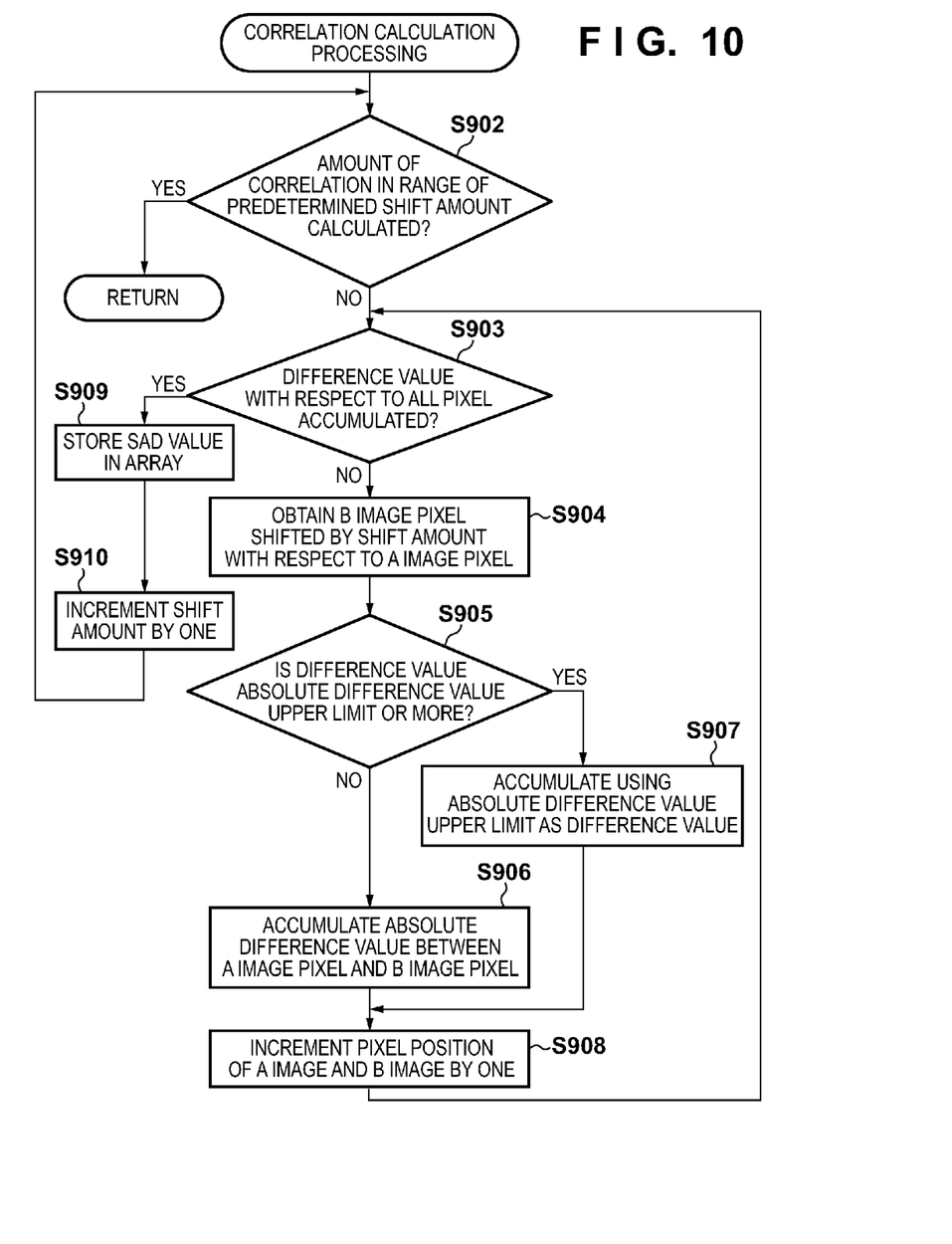
FIG. 10 is a flowchart illustrating correlation calculation processing performed in a second embodiment of the present invention.

FIG. 10 is a flowchart illustrating operations performed by the correlation calculation unit 407 in the present embodiment. The operations are executed by a CPU included in the correlation calculation unit 407 deploying on a RAM a program stored in a ROM and executing the program.

In step S902, the CPU checks whether or not amounts of correlation with respect to the range of a predetermined shift amounts (here on the assumption that the range is from −100 to +100) have been calculated.

In step S903, the CPU checks whether or not processing has been performed with respect to all pixels (here on the assumption that there are 100 pixels) that constitute an A image signal.

In step S904, the CPU takes a processing target pixel of the A image signal, and a pixel of a B image signal that is located at the position shifted by a shift amount with respect to the processing target pixel of the A image signal.

In step S905, the CPU determines whether or not the absolute difference value between the A image pixel and the B image pixel is the upper limit or more, and if it is determined that the absolute difference value is the upper limit or more, the processing advances to step S907, and if it is determined that the absolute difference value is less than the upper limit, the processing advances to step S906.

In step S906, the CPU accumulates the absolute difference values between the A image pixel and the B image pixel.

In step S907, the CPU accumulates the absolute difference value upper limits as the absolute difference value between the A image pixel and the B image pixel.

In step S908, the CPU increments the pixel positions of the A image signal and the B image signal by one, and returns the processing to step S903.

The processing steps from S903 to S908 are repeated the same number of times as the number of pixels of the A image signal, and then the CPU advances the processing to step S909, where the accumulated value of the absolute difference values is stored, as an amount of correlation, in a variable with subscript that corresponds to the shift amount, among the array variables. Here, since the range of the shift amounts is from −100 to +100, and the shift amount is changed one by one, 201 individual amounts of correlation are computed. Therefore, array variables that include at least 201 elements are prepared.

In step S910, the CPU increments the shift amount by one, and returns the processing to step S902.

By repeatedly performing the processing steps from S902 to S910 over the range of predetermined shift amounts, a correlation image can be obtained in the array variables.

Also in the present embodiment, similar effects to those of the first embodiment can be achieved. Further, since the correlation calculation unit 407 is realized by software, the circuit size can be minimized as compared with that of the first embodiment.

Other Embodiments

Also, the present invention is realized by executing the following processing. That is, software (a program) that realizes the functions of the above-described embodiments is supplied to a system or an apparatus via a network or various types of storage media, and a computer (or a CPU, MPU, or the like) of the system or the apparatus reads out the program and executes the read program.

Note that in the above-described embodiments, if an absolute difference value between the A image signal and the B image signal is an upper limit or more, the absolute difference value is replaced with the upper limit, but the effect of suppressing the influence of the absolute difference value in the saturated part on an amount of correlation can be realized by using other configurations. For example, if the absolute difference value is not less than the upper limit, the absolute difference value may be replaced with a fixed value that is less than the upper limit. That is, the absolute difference value can be replaced with a fixed value that is not more than the upper limit. However, if the absolute difference value is replaced with 0, the accumulated values for different numbers of pairs of pixels are changed to a comparative value, such as an amount of correlation for each pair of pixels obtained by dividing the amount of correlation by the number of pair of pixels that were actually accumulated.

Also, in the above-described embodiments, a defocus amount is decided after the correlation image is obtained. However, if it is sufficient to obtain a shift amount when an amount of correlation is the smallest, each time that an amount of correlation is obtained, the amount of correlation is compared with the previously computed minimum value of the amount of correlation, and only the minimum amount of correlation and corresponding shift amount may be stored. In this case, the defocus amount computing unit 408 needs only to compute a defocus amount by multiplying the minimum amount of correlation obtained by the correlation calculation unit 407 by a base length, and performs focus control.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-178921, filed on Aug. 10, 2012, which is hereby incorporated by reference herein its entirety.

What is claimed is:

1. An image pickup apparatus for processing signals obtained from an image sensor that includes a plurality of pixels in each of which a first photoelectric conversion unit and a second photoelectric conversion unit are provided, the image pickup apparatus comprising:

a computing unit which computes a shift amount, which is used for focus detection based on the phase-difference detection method, between a first image signal that is obtained from outputs of the first photoelectric conversion units and a second image signal that is obtained from outputs of the second photoelectric conversion units; and a unit which performs focus control of an imaging lens on the basis of the shift amount, wherein the computing unit computes the shift amount from an amount of correlation based on a difference value between the first image signal and the second image signal, the difference value being computed by shifting relative positions between the first image signal and the second image signal, and computes the amount of correlation, if the difference value is not less than a predetermined upper limit, using a predetermined value that is not more than the upper limit as the difference value.

2. The image pickup apparatus according to claim 1, wherein the computing unit computes the amount of correlation, if the difference value is not less than the predetermined upper limit, using the upper limit as the difference value.

3. The image pickup apparatus according to claim 1, wherein the pixels are configured such that if one of the first photoelectric conversion unit and the second photoelectric conversion unit is saturated, an electric charge leaks from the saturated photoelectric conversion unit into the other photoelectric conversion unit.

4. A method for controlling an image pickup apparatus for processing signals obtained from an image sensor that includes a plurality of pixels in each of which a first photoelectric conversion unit and a second photoelectric conversion unit are provided, the method comprising:

a computing step of computing a shift amount, which is used for focus detection based on the phase-difference detection method, between a first image signal that is obtained from outputs of the first photoelectric conversion units and a second image signal that is obtained from outputs of the second photoelectric conversion units; and a step of performing focus control of an imaging lens on the basis of the shift amount, wherein the computing step includes:

a step of computing the shift amount from an amount of correlation based on a difference value between the first image signal and the second image signal, the difference value being computed while relative positions of the first image signal and the second image signal are being shifted, and the amount of correlation is computed, if the difference value is not less than a predetermined upper limit, using a predetermined value that is not more than the upper limit as the difference value.

5. A non-transitory computer-readable storage medium having stored therein a program for causing a computer to execute the steps of the method for controlling an image pickup apparatus according to claim 4.

* * * * *